UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTICS.

1,128,468.  Specification of Letters Patent.  Patented Feb. 16, 1915.

No Drawing.   Application filed November 27, 1911.   Serial No. 662,746.

*To all whom it may concern:*

Be it known that I, WILLIAM G. LINDSAY, a citizen of the United States, residing in Caldwell, county of Essex, State of New Jersey, have invented certain new and useful Improvements in Processes of Making Acetyl-Cellulose Plastics, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used in the amount of the original base—acetyl cellulose.

It has been known for many years that camphor and ethyl alcohol in admixture form a solvent for nitrocellulose in the cold or at room temperature, and also that camphor can be mixed with the nitrocellulose and that the subsequent addition of ethyl alcohol causes solution or conversion of the nitrocellulose. It is also well known that camphor is a combustible substance and that when mixed even with acetyl cellulose and a liquid solvent, the resulting compound is more or less combustible, and it was the object of my experiments to find substances which in a suitable combination would effect solution or conversion of the acetyl cellulose into a plastic mass which, upon the application of heat and pressure can be molded or otherwise worked in a manner analogous to the nitrocellulose-camphor compounds.

In the course of my experiments I have found that acetyl cellulose plastic compounds of the kind desired can be produced by the use of triphenylphosphate or tricresylphosphate or a mixture of the two, in conjunction with either methyl or ethyl alcohol; but, as there is an observable difference between the action of ethyl and methyl alcohol in conjunction with the phosphates, I prefer the methyl alcohol. I also prefer the use of triphenylphosphate because in conjunction with methyl alcohol it seems to exert a more powerful action on the acetyl cellulose and also because the triphenylphosphate is more soluble in methyl alcohol than in ethyl alcohol. Nevertheless, I have succeeded in producing useful compounds by the employment of tricresylphosphate and also triphenylphosphate in conjunction with both ethyl alcohol and methyl alcohol. Of the two phosphates, I prefer triphenylphosphate for the reason that it seems to exert a more powerful solvent action on acetyl cellulose when used in conjunction with the alcohols named than does tricresylphosphate.

In this specification and the claims appended hereto, I refer only to that variety of acetyl cellulose which is soluble in acetone in the cold.

As an example of carrying out my invention, I take 100 parts of acetyl cellulose (soluble in acetone). I add from 10 to 30 parts of triphenylphosphate and thoroughly mix the two by grinding, stirring, etc. I then add the ethyl alcohol or methyl alcohol, or a mixture of the two. After careful mixing with 30 to 45 parts of methyl or ethyl alcohol, the mass is allowed to stand from 12 to 24 hours or longer in a covered vessel in order to secure good penetration. The mass is then subjected to heat applied by means of a boiling water bath or a steam bath of 100° C. The mixture can also be manipulated by kneading or malaxating under the influence of heat if desired, and then subjected to pressure. The hot thoroughly mixed mass is pressed in a suitable mold or form. When a compact mass or cake has been thus produced it is cooled while still under pressure, and in this manner a solid mass results which is suitable for cutting into sheets in the usual way, or the mold may be of such a form that the shape finally desired may be given to the object by this one operation. The sheets or other objects produced by this process are then subjected to drying or seasoning, as is common with nitro cellulose compounds.

When using the tricresylphosphate the process is similar to that above described and ethyl alcohol can be used as stated instead of methyl alcohol with both the phosphates, but the solvent thus produced with ethyl alcohol exerts a more feeble action on the acetyl cellulose than when methyl alcohol is used.

It will be understood by the skilled operator that the ingredients of the new solvent mixtures described can be added to the acetyl cellulose in any desired order. It will also be understood by the operator that various combinations of the solvents described can be used if desired: thus a mixture of triphenylphosphate and tricresylphosphate may be used with either methyl alcohol or ethyl alcohol or a mixture of the two alcohols. Again, either one or both of the alcohols named may be used singly or in admixture with either of the phosphates named.

It should be stated also that my new solvent mixtures can be used in conjunction with other known solvents that are not incompatible therewith, and with diluents and coloring matters and other inert substances, as is common to the nitrocellulose art.

The exact proportions of ingredients named are not essential to the spirit of my invention for they may be changed to some degree without preventing solvent action under the application of heat, although I prefer the proportions specified.

Having thus described my invention, what I claim is:—

1. The process of making acetyl cellulose plastic masses which comprises incorporating an acetone-soluble acetyl cellulose with a triarylphosphate having not more than seven carbon atoms in the aryl group in the presence of a small proportion of a suitable alcohol and heating, substantially as set forth.

2. The process of making acetyl cellulose plastic masses which comprises incorporating an acetone-soluble acetyl cellulose with triphenylphosphate in the presence of a small proportion of methyl alcohol and heating, substantially as set forth.

WILLIAM G. LINDSAY.

Witnesses:
J. E. HINDON HYDE,
MABEL DENTON.